United States Patent
Dweck

(10) Patent No.: US 7,346,548 B2
(45) Date of Patent: Mar. 18, 2008

(54) SYSTEM, METHOD, APPARATUS AND MEANS EVALUATING HISTORICAL NETWORK ACTIVITY

(75) Inventor: Jay S. Dweck, Armonk, NY (US)

(73) Assignee: Goldman Sachs & Co., New York, NY (US)

( * ) Notice: Subject to any disclaimer, the term of this patent is extended or adjusted under 35 U.S.C. 154(b) by 300 days.

(21) Appl. No.: 10/036,079

(22) Filed: Oct. 25, 2001

(65) Prior Publication Data

US 2003/0083960 A1 May 1, 2003

(51) Int. Cl.
*G06Q 30/00* (2006.01)
(52) U.S. Cl. ........................................ 705/26
(58) Field of Classification Search .................. 705/26, 705/27; 345/745
See application file for complete search history.

(56) References Cited

U.S. PATENT DOCUMENTS

| | | | | |
|---|---|---|---|---|
| 5,848,396 | A * | 12/1998 | Gerace | 705/10 |
| 6,014,638 | A * | 1/2000 | Burge et al. | 705/27 |
| 6,236,978 | B1 * | 5/2001 | Tuzhilin | 705/26 |
| 6,381,632 | B1 * | 4/2002 | Lowell | 709/203 |
| 6,415,319 | B1 * | 7/2002 | Ambroziak | 709/219 |
| 2002/0063735 | A1 * | 5/2002 | Tamir et al. | 345/745 |
| 2002/0180786 | A1 * | 12/2002 | Tanner | 345/745 |

FOREIGN PATENT DOCUMENTS

JP 10240605 A * 9/1998

OTHER PUBLICATIONS

"How to Personalize the Web" (Barret, Rob et al. Excised from web.archive.org—dated Oct. 13, 1999).*
"Intermediaries; An approach to manipulating information streams" (Barrett, Rob, et al. 1999. IBM Systems Journal).*
"Intermediaries personalize information streams" (Barrett, Rob et al. 2000. Association for Computing Machinery).*
"IBM software Agent Technology Helps Users Control Web Information"; Business Wire; Jul. 30, 1997.*
"Thin clients: back to the future"; Jeff Richardson; InTech; Sep. 2001.*
"Taming the desktop"; Cynthia Morgan; Computerworld: Apr. 19, 1999.*

* cited by examiner

*Primary Examiner*—James Zurita
(74) *Attorney, Agent, or Firm*—Buckley, Maschoff & Talwalker LLC

(57) ABSTRACT

A system, method, apparatus, and means for adjusting network preference information which includes detecting network activity. A characteristic of the network activity is measured. Network preference information is adjusted based on the characteristic. In some embodiments, network activity is network activity by a client device such as a computer accessing a network site.

7 Claims, 6 Drawing Sheets

| TIME 202 | NETWORK LOCATION 204 | CHARACTERISTIC A 206a | CHARACTERISTIC N 206n |
|---|---|---|---|
| 1/1/01; 12:32 | www.cnn.com | duration=24min | window size=full |
| 1/1/01; 12:34 | www.nytimes.com | duration=2min | window size=full |
| 1/1/01; 12:55 | www.espn.com | duration=21min | window size=small |
| 1/1/01; 1:35 | www.cnn.com | duration=40min | window size=full |

SYSTEM, METHOD, APPARATUS AND MEANS EVALUATING HISTORICAL NETWORK ACTIVITY

FIELD OF THE INVENTION

The present invention relates to the transmission of information over networks. In particular, embodiments of the present invention relate to the recording and evaluation of historical network activity.

BACKGROUND OF THE INVENTION

Networks such as the Internet have become ubiquitous and useful tools for individuals and businesses. Users frequently point their Internet browsers to World Wide Web (the "Web") sites which they find particularly useful or interesting. For example, a financial analyst may frequent Web sites which provide current and timely market information. Some Internet browser software tools allow users to establish preferences to help users quickly point their browser to favorite Web sites. For example, Microsoft Corporation's Internet Explorers® browser allows a user to record one or more network addresses as "Favorites". A financial analyst with a current favorite financial news Web site can designate the current favorite site as a "Favorite" in his browser. Unfortunately, however, such recording requires the user to take conscious and specific steps to designate a particular network address or Web site as a "Favorite". Further, this approach to identifying preferred addresses provides little, if any ability for a user to evaluate network sites visited. For example, a user may find some network sites more interesting than others, yet will have no way of recording this.

It would be advantageous to provide a method and apparatus that overcame the drawbacks of the prior art. Therefore, it would be desirable to provide some ability to evaluate historical network activity. Further, it would be desirable to provide an ability to evaluate historical network activity, and establish network preference information, with little or no input from the user.

SUMMARY OF THE INVENTION

To alleviate the problems inherent in the prior art, and to allow the efficient and automated selection of network preferences, embodiments of the present invention provide a system, method, apparatus, and means for adjusting network preference information which includes detecting network activity. A characteristic of the network activity is measured. Network preference information is adjusted based on the characteristic. In some embodiments, network activity is network activity by a client device such as a computer accessing a network site.

In some embodiments, the preference information is used to update or configure application software of the client device, such as, for example, browser software used by the client device to access network sites. In some embodiments, the characteristic information is information about a particular interaction between the client device and a network site, such as, for example, the amount of time spent at the site, the frequency of visits to the site by the client device, the number of downloads from the site by the client device, the window size used to view information at the network site, an amount of interaction while viewing the network site, etc.

In some embodiments, characteristics are measured from a number of different detected network activities. In some embodiments, characteristics are measured for a number of different client devices. In some embodiments, preference information is updated for a number of different client devices based on the measured characteristics.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 4 is a table depicting example characteristic information for use in the present invention;

DETAILED DESCRIPTION OF THE INVENTION

Applicants have recognized that there is a need for a system, method, apparatus and means for evaluating historical network activity. One benefit of embodiments of the present invention is that a network user or network administrator may evaluate historical network activity of one or more users. Further, users may readily establish network preference information with little or no input from the user. Other features and advantages will become apparent to those skilled in the art upon reading this disclosure.

Figure 1:
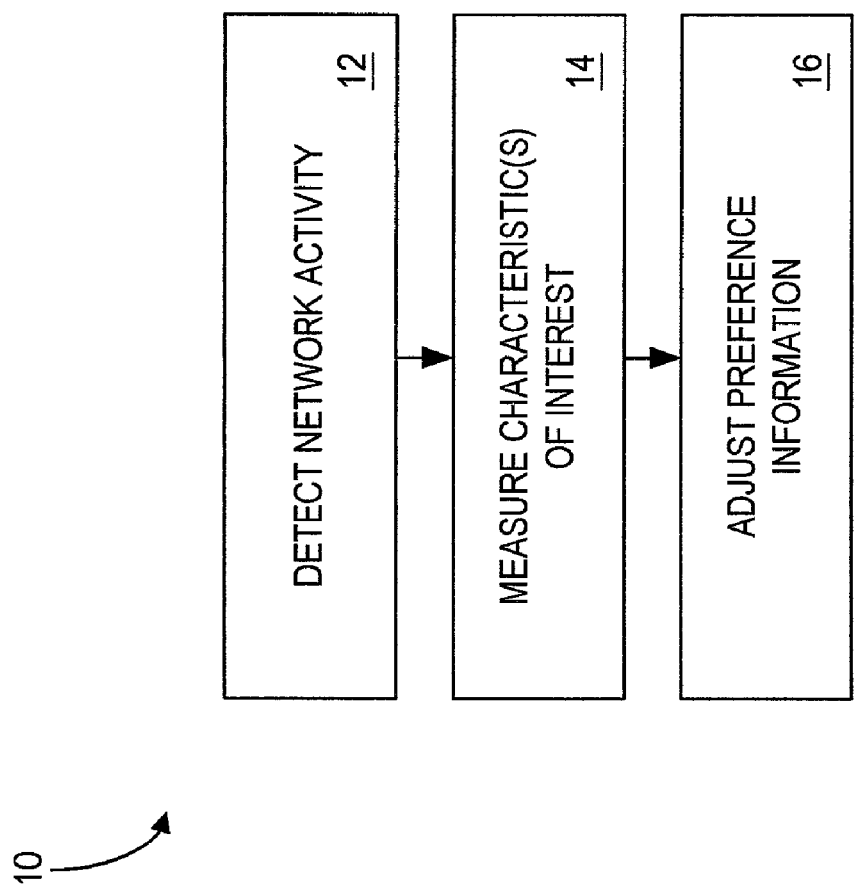
FIG. 1 is a flow diagram illustrating an exemplary process for evaluating historical network activity according to some embodiments of the present invention.

A description of a method pursuant to some embodiments of the present invention will now be provided by referring to the flow chart of FIG. 1. The particular arrangement of elements in the flow chart of FIG. 1 (and the other flow charts provided herein) is not meant to imply a fixed order to the steps; embodiments of the present invention can be practiced in any order that is practicable.

FIG. 1 depicts a process 10 for evaluating historical network activity and establishing preferences pursuant to one embodiment of the present invention. Process 10 may be used by a network user operating a user device (such as, for example, a personal computer) to access network sites. As an example, process 10 may be performed under the control or direction of software installed on a personal computer operated by a network user and which evaluates historical network activity and establishes preferences for the user based on the user's use of the personal computer while accessing Internet sites via the Web. This software may be installed as an Internet browser plug-in or other software component which is capable of detecting network activity as the user directs the user device to access various network sites. This software may be previously configured by a user, network administrator, or other entity interested in evaluating historical network activity and establishing preferences using the present invention. For example, as will be discussed further below, the software may be configured to measure particular characteristics of interest so that those characteristics of interest may be used to evaluate historical network activity and/or establish preferences.

Process 10 begins at 12 where network activity is detected. For example, in embodiments where features of embodiments of the invention are implemented as a browser plug-in or other software component, processing at 12 includes detecting a user's interaction with an Internet browser to access Internet sites via the Web. Detection of network activity at 12 may include detecting information about particular visits to particular Internet sites. For example, each time the Internet browser is directed to a new Internet site, network activity will be detected at 12.

Processing continues at 14 where characteristic(s) of interest are measured. That is, for each network activity detected by the system, some characteristics of interest are measured. The types of characteristics of interest to be measured may be previously selected by the user, a network administrator, or other entity or individual interested in evaluating historical network activity and/or establishing preferences pursuant to embodiments of the present invention. For example, a user may select or modify the types of characteristics of interest by configuring browser software when the software is installed or by modifying options or preferences of the software after installation. In some embodiments, the browser or application software used to implement features of embodiments of the invention has pre-set or pre-established types of characteristics of interest.

A number of different types and combinations of characteristics of interest may be measured such as, for example: the time spent at a particular network site; the frequency of visits to a particular network site; the number of downloads by the user from the network site; the user's window size while visiting a particular network site; a number of keystrokes entered by the user while visiting the network site; or the like. Information about each of these characteristics of interest may be measured, for example, each time network activity is detected. For example, if the characteristic of interest to be measured for a particular user is the time spent at each network site, a counter or timer is started each time the Internet browser is directed to a new site. In some embodiments, the time is measured for the total time the Internet browser is pointed to a particular top level domain, including time spent at particular Web pages subsidiary to the top level domain. In some embodiments, the time is measured for the total time spent at each Web page.

This information about one or more characteristics of interest is then stored for further analysis. For example, the information may be stored in a database or table of characteristics stored at, or accessible to, the user's computer. This database or table of characteristics may include information such as, for example, an identification of each Internet site visited, and details regarding one or more measured characteristic of interest regarding the visit (e.g., the duration of the visit, the size of the window when viewing the site, the number of downloads by the user from the site, the number of keystrokes entered while viewing the site, etc.). In some embodiments, information indicating active use or viewing of pages will also be stored. For example, a user who uses www.cnn.com as her home page may not actively be viewing the site at all times. To track such inactivity, some embodiments of the present invention will track the number of page interactions or determine whether the Web page was on as the primary window of the user's desktop or was simply located in the background. Other uses of characteristic(s) of interest measured and detected at 14 will be described further below.

Processing continues at 16 where preference information is adjusted. According to some embodiments of the present invention, a user's preference information may be generated and adjusted based on the characteristic(s) of interest measured at 14. Adjustments to preference information may be performed, for example, by comparing characteristic(s) of interest measured for particular Internet sites visited by the user, and ranking the sites based on the measured characteristics. As an example, for a user who repeatedly visits www.cnn.com more than any other Internet site, processing at 16 may involve establishing www.cnn.com as the user's preferred Internet site. Further, a user's preferences may be broken down by type of site as well. For example, the user who frequents www.cnn.com may have the site designated as the user's preferred Internet news site. Adjustments to preference information may be performed on a regular basis (e.g., hourly, daily, or the like), or they may be performed each time new characteristics of interest are measured at 14. The user who typically reads the news at www.cnn.com may have his preferences automatically adjusted as soon he begins to frequent www.nytimes.com more than www.cnn.com.

Processing at 16 may also include the adjustment of preferences for a group of users based on characteristic(s) of interest measured for each of the individuals in the group. For example, a network administrator for an entity may utilize techniques of the present invention to monitor network activity by the entire group. In such an embodiment, characteristic information measured for each user may be stored at, or accessible to, a central network device operated by the network administrator. This information may be used to establish preferences for the group, and may also be used to monitor, adjust, and otherwise respond to network usage and to balance network loads.

For example, the characteristic(s) of interest measured at 14 for the group may indicate that a large number of users in the group have downloaded a particular document from an Internet or intranet site. The network administrator may improve network balance by directly distributing the document or by otherwise making the document available in a way which improves network performance (e.g., by moving the document to a less used server to ease the strain on the server at which the document was originally located). As another example, a supervisor may utilize the characteristic (s) of interest measured for her subordinates to ensure that the subordinates are properly performing their assigned tasks. Those skilled in the art will recognize that characteristic information measured pursuant to embodiments of the present invention may be used in other applications as well.

Figure 2:
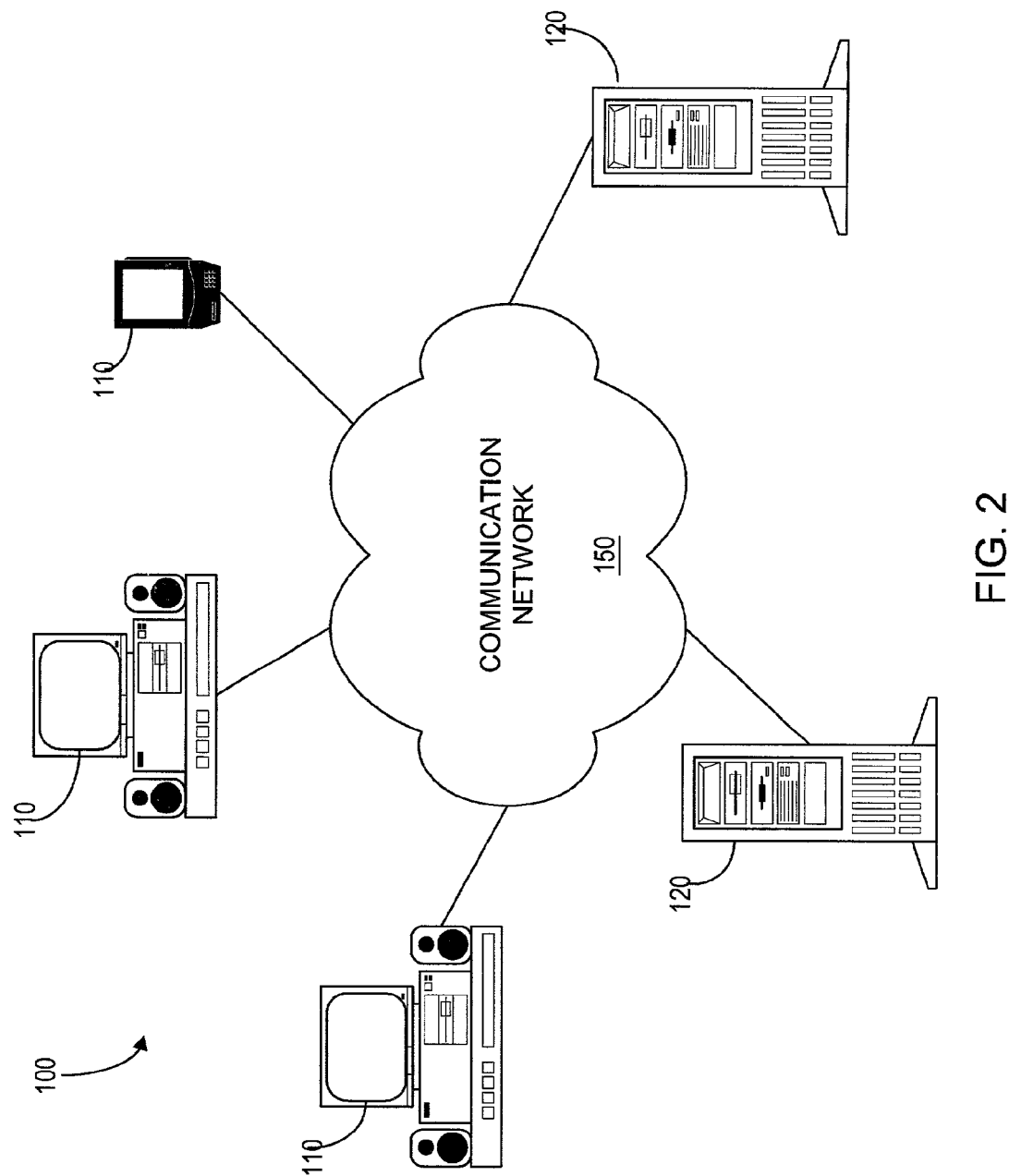
FIG. 2 is a block diagram of a system consistent with the present invention.

Referring now FIG. 2, a system 100 according to embodiments of the present invention includes a number of user devices 110 that are in communication with a number of servers 120 via a communication network 150.

As used herein, communication network 150 may employ any of a number of different types and modes of communication, and may be for example, a Local Area Network (LAN), a Metropolitan Area Network (MAN), a Wide Area Network (WAN), a proprietary network, a Public Switched Telephone Network (PSTN), a Wireless Application Protocol (WAP) network, a wireless network, a cable television network, or an Internet Protocol (IP) network such as the Internet, an intranet or an extranet. Moreover, as used herein, communications include those enabled by wired or wireless technology. As used herein, the term "network site" is used to refer to any addressable network location, such as, for example, a particular location on the Internet.

Any of a number of different types of user devices 110 may be used to communicate using features of embodiments of the present invention. For example, in some embodiments, user device 110 may be a computer, such as those based on the Intel® Pentium® processor, that are adapted to communicate via network 150. The computer may be configured in any of a number of different manners, such as, for example, as a desk-top computer, lap-top computer, hand-held computer, personal digital assistant (PDA), or the like. Each user device 110 may operate software applications allowing the device to access information from servers 120 via network 150 (such as, for example, Internet browser software including Internet Explorer® from Microsoft Corporation® or Navigator® from the Netscape Corporation®). Further, each user device 110 may operate software applications used to detect network activity by the user device 110, measure characteristics of interest by a user of the device, and adjust preference information based on the measured characteristics. Any number of user devices 110 and servers 120 may be in communication via network 150.

Server 120 may be configured in any of a number of ways known to those skilled in the art, such as, for example, an Intel® Pentium® based-computer or the like. Server 120 may function as a "Web server" that generates Web pages (documents on the Web that typically include an HTML file and associated graphics and script files) that may be accessed via the Web and allows communication with user devices 110 in a manner known in the art. Each server 120 may store (or, "host") a number of different Web sites and Web pages, each having different network addresses. Servers 120 may be accessible via the Internet, an intranet, or other communication networks 150.

In some embodiments, some user devices 110 or groups of user devices 110 may be in communication with network 150 via one or more servers 120 (e.g., where the server is operated by a network administrator on behalf of the group, or where the server is operated by an Internet Service Provider (ISP) to provide Internet access for the group). Those skilled in the art will recognize that a number of other server configurations may also be used.

Figure 3:
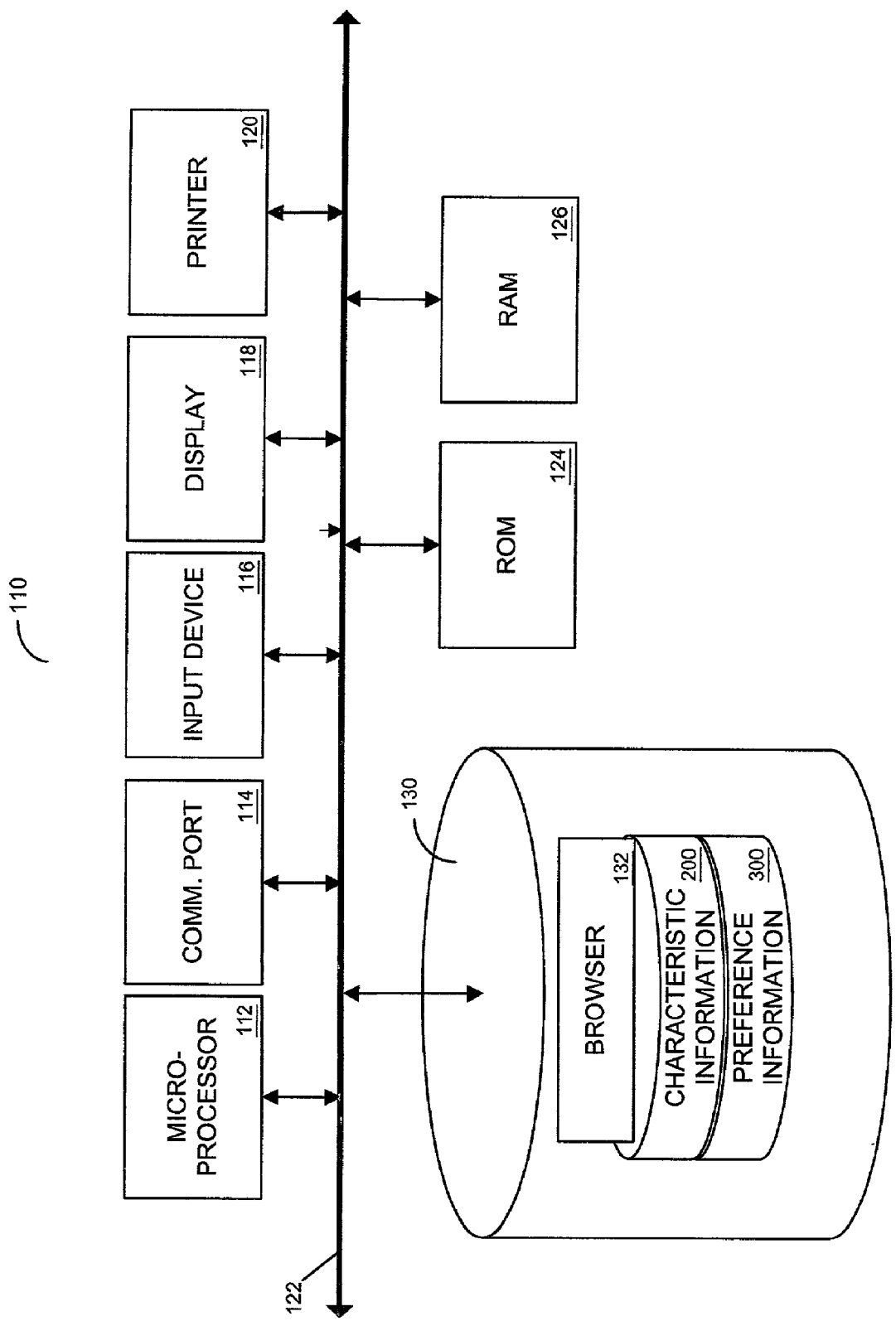
FIG. 3 is a block diagram of one embodiment of a user device for use in the present invention.

FIG. 3 illustrates an embodiment of a user device 110. Any or all of the user devices 110 may be implemented as a system controller, a dedicated hardware circuit, an appropriately programmed general purpose computer, or any other equivalent electronic, mechanical or electromechanical device. As illustrated, user device 110 includes a microprocessor 112 in communication with a communication bus 122. Microprocessor 112 may be a Pentium®, RISC®-based, or other type of processor and is used to execute processor-executable process steps so as to control the components of user device 110 to provide desired functionality.

Also in communication with communication bus 122 is a communication port 114. Communication port 114 is used to transmit data to and to receive data from external devices, such as, for example, other user devices 110 via a network such as the Internet. Communication port 114 is therefore preferably configured with hardware suitable to physically interface with desired external devices and/or network connections. In one embodiment, network communication sessions which are evaluated pursuant to embodiments of the present invention are conducted via communication port 114.

An input device 116, a display 118 and a printer 120 are also in communication with communication bus 122. Any known input device may be used as input device 116, including a keyboard, mouse, touch pad, voice-recognition system, or any combination of these devices. Input device 116 may be used by a user to access and interact with network sites.

Information, such as Web pages, documents, or the like are viewed by a user operating user device 110 via display 118, which may be an integral or separate CRT display, flat-panel display or the like. Display 118 is used to output graphics and text to a participant operating device 110 in response to commands issued by microprocessor 112. Printer 120 is also an output device, and may be used to produce hardcopy output of data using ink-jet, thermal, dot-matrix, laser, or other printing technologies.

User device 110 also includes memory devices coupled to communication bus 122, such as, for example, random-access memory (RAM) 126, read-only memory (ROM) 124, and data storage device 130. RAM 126 may be used, for example, to provide microprocessor 112 with fast data storage and retrieval. In this regard, processor-executable process steps being executed by microprocessor 112 are typically stored temporarily in RAM 124 and executed therefrom by microprocessor 112. ROM 124 may be utilized to provide storage from which data can be retrieved but to which data cannot be stored. Accordingly, ROM 124 is typically used to store invariant process steps and other data, such as basic input/output instructions and data used during system boot-up or to control communication port 114.

Data storage device 130 stores, among other data, a browser program 132 including processor-executable process steps used to provide network access and viewing functionality pursuant to embodiments of the present invention. Browser program 132 may be, for example, a commercially-available browser program such as the Internet Explorer®. According to some embodiments, browser program 132 further includes functionality to detect certain types of network activity (e.g., such as each new page or site access by a user), measure characteristic(s) of interest associated with each network activity detected (e.g., such as tracking the amount of time spent at a particular site), and adjusting preference information associated with the user device or group of devices (e.g., indicating a particular site as a preferred site based on a measured high degree of interest in the site by a user). This additional functionality may be provided as a plug-in or add-on to an existing browser software application, or it may be made an integral part of browser program 132.

According to some embodiments, these process steps of browser program 132 may be read from a computer-readable medium, such as a floppy disk, a CD-ROM, a DVD-ROM, a Zip disk, a magnetic tape, or a signal encoding the process steps, and then stored in data storage device 130. Microprocessor 112 executes stored instructions to cause user device 110 to operate in accordance with the process steps described in detail herein.

Data storage device 130 may also store data, such as, for example, characteristic information 200 and preference information 300 used by browser program 132 to achieve the functionality described herein. Data and instructions in data storage device 130 may be stored in a compressed, uncompiled and/or encrypted format. In alternative embodiments, hard-wired circuitry may be used in place of, or in combination with, processor-executable process steps for implementation of the processes of the present invention. Thus, embodiments of the present invention are not limited to any specific combination of hardware and software.

Characteristic information 200 may include data identifying characteristics of different site visits by client device 110. In some embodiments, each user may select and identify specific characteristics which are to be collected. In some embodiments, a number of pre-established characteristics are identified and tracked to establish preferences for each user. Example characteristic data will be described further below in conjunction with a description of FIG. 4.

Preference information 300 may include data identifying the particular preferences that have been established for client device 110 based on historical network activity from that device. This preference information may be broken down by the most visited or used sites without further categorization, or it may be broken down by network site types or categories (e.g., the user's most frequented news sites will be ranked separately from the user's most frequented financial analysis sites). Example preference information 300 will be described further below in conjunction with a description of FIG. 5. Characteristic information 200 and preference information 300 may also be stored and collected for groups of user devices. For example, this information may be stored and collected by a network administrator for all user devices in a corporate network managed by the administrator.

Data storage device 130 also includes elements that may be necessary for operation of user device 110, such as other applications, data files, an operating system, a database management system and "device drivers" for allowing microprocessor 112 to interface with devices in communication with communication port 114. These program elements are known to those skilled in the art, and are therefore not described in detail herein.

Referring now to FIG. 4, a table 200 represents characteristic information that may be stored at (or accessible to) user device 110 according to an embodiment of the present invention. The table includes entries identifying one or more characteristics of a user's network activities which have been detected using techniques of the present invention. The table also defines fields 202-206 for each of the entries. The fields specify: a time 202, a network location 204, and one or more characteristics 206a-n. The information in table 200 may be created and updated, for example, based on information detected and captured by browser program 132 as the user device 110 is operated to access network sites.

Time 202 may be, for example, data indicating a particular date, time, or other chronological information that a particular network location was accessed by a user operating user device 110. In some embodiments, a simple counter may be used to track the time. In other embodiments, as depicted in FIG. 4, the actual time and date may be identified.

Network location 204 includes information identifying a particular network location accessed by user device 110 at the time indicated by time 202. In some embodiments, only a high-level domain name is tracked (e.g., www.cnn.com rather than www.cnn.com/news/flashes/november). In other embodiments, all network addresses are tracked to establish preference data pursuant to embodiments of the present invention. Although the depicted examples utilize Internet Universal Resource Locator (URL) conventions, other network address and naming conventions may also be used.

Characteristics 206a-n include information identifying particular characteristics which were identified by the present invention and associated with a particular visit to the network location identified at 204 at the time identified by time 202. A number of different types of characteristic information may be identified and tracked, such as, for example: the time spent at the location; the size of the viewing window; the number of user keystrokes while visiting the site; downloads from the site; repeat visits to the site in a given time period; etc.

Those skilled in the art will recognize that other characteristic information may also be captured and stored for use in establishing and maintaining preferences pursuant to embodiments of the present invention.

Figure 5:
FIG. 5 is a table depicting example preference information for use in the present invention.

Referring now to FIG. 5, a table 300 represents preference information that may be stored at (or accessible to) user device 110 according to an embodiment of the present invention. The table includes entries identifying one or more network preferences that have been established for a particular user and/or a particular user device 110 based on historical network activity of the user and/or the user device 110. The table also defines fields 302-306 for each of the entries. The fields specify: a preference rank 302, a network location 304, and a network location type 306. The information in table 300 may be created and updated, for example, based on characteristic information which has been detected and captured by browser program 132 as the user device 110 is operated to access network sites. In some embodiments, preference information is updated each time new characteristic information is captured. Not all updates to characteristic information will result in updates to preference information (e.g., a user's first visit to a particular network site will likely not result in that site being added to the user's list of preferences).

Preference rank 302 may be, for example, data indicating a ranking for a particular network site visited by a user operating user device 110. This preference rank 302 may be established by comparing different types of characteristics measured and stored. For example, in the example depicted in FIGS. 4 and 5, the user directed his user device 110 to www.cnn.com quite frequently, and for a proportionally large amount of time. As a result, based on the historical network activity shown in FIG. 4, the users preferred site is www.cnn.com. In some embodiments, tiered rankings may be used to rank different types of network locations by type (e.g., news sites, sports sites, financial sites, etc.). These preference rankings may change on a frequent basis (e.g., each time relevant characteristic information is collected), or they may change on a periodic basis (e.g., hourly, daily, weekly, etc.).

Network location 304 is information identifying the particular network site associated with the ranking set forth in preference rank 302. Network location type 306 is information identifying a particular type or category of the network site identified by 304. Those skilled in the art will recognize that other information may be stored and used to establish preferences using techniques of the present invention. In some embodiments, the information stored in table 300 is used to update preferences of browser program 132, allowing a user to quickly and efficiently access network sites that particularly interest the user. Further, pursuant to embodiments of the present invention, this information changes substantially without requiring any intervention from the user.

Figure 6:
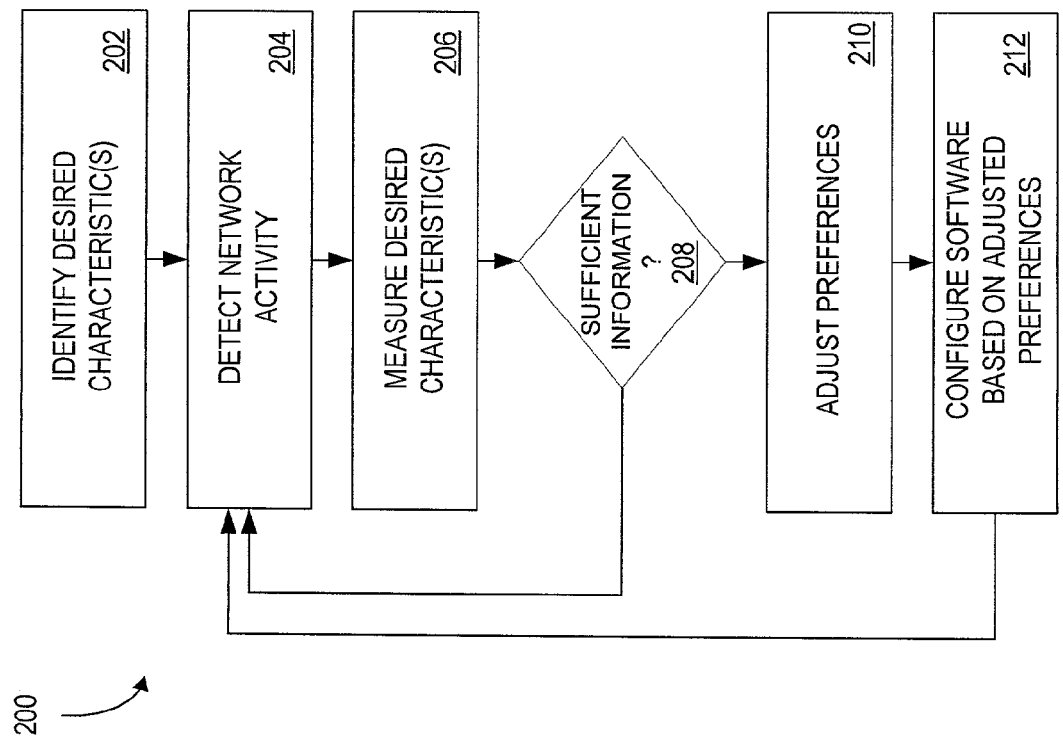
FIG. 6 is a flow diagram illustrating an exemplary process for evaluating historical network activity according to further embodiments of the present invention.

Referring now to FIG. 6, a further flow diagram is depicted showing a further process 200 pursuant to embodiments of the present invention. As in the process described in conjunction with FIG. 1, the depicted steps may be performed in any order. In some embodiments, process 200 is performed under the direction of software installed on user devices 110. In some embodiments, process 200 is performed under the direction of software installed on both user devices 110 and on a network entity, such as a server 120 operated by a network administrator or other entity.

Process 200 begins at 202 where a user, network administrator, or other individual or entity interacts with the system to identify desired characteristic(s). For example, a user may configure browser software to monitor and analyze network activity for particular characteristics important to the user (such as, for example, the amount of time spent at each Web site, etc.). This allows the user or other entity to prepare the user device to automatically establish preferences in a manner desirable to the user. This information may be stored at a database or table such as the characteristic table of FIG. 4.

Processing continues at 204 where embodiments of the present invention detect network activity. For example, in embodiments where features of the present invention are implemented as a browser plug-in or modification, the plug-in operates in conjunction with the browser program to identify when each network site is accessed. Processing continues at 206 where desired characteristic(s) are measured. In the depicted embodiment, the desired characteristic(s) which are important to the user or other individual have previously been identified at 202. Processing at 206 includes capturing the data needed to measure the desired characteristic. For example, if the desired characteristic to be measured is the amount of time spent at a particular network site, processing at 206 includes measuring the time at the network site detected at 204. This information may be stored, for example, in a database or table such as the characteristic table of FIG. 4.

Processing continues at 208 where a determination is made whether sufficient characteristic data has been captured to establish or adjust preferences. In the depicted embodiment, preferences may be adjusted only after sufficient characteristic information has been gathered. For example, in some embodiments, preferences may be updated or adjusted at the end of each day, at the end of each week, or at the end of some other period of time. In other embodiments, preferences may be updated or adjusted only after a certain number of network sites have been visited (e.g., after each 100 Web page accesses). This permits preferences to be adjusted based on statistically significant amounts of data. Other factors may also be used to determine whether sufficient information has been collected before updating or adjusting preferences. If insufficient information has been collected, processing reverts back to 204 as new network activity is detected.

If processing at 208 indicates that sufficient information has been collected to justify adjusting or updating preferences, processing continues to 210 where the preferences are automatically adjusted. For example, if the characteristic of interest identified at 202 is the amount of time spent at each network site, and the data collection at 206 indicates that the user spends the most of her time at www.bloomberg.com, then processing at 210 will establish www.bloomberg.com as a preferred network site.

Processing continues at 212 where software is configured based on the adjusted preferences. This may involve, for example, modifying the configuration of the user's browser software or other application software to reflect the new or updated preference. For example, the preferred network address may be added to a list of "Favorites" or it may result in the network address being made the user's default home or starting page. In some embodiments, processing at 210 and 212 may result in the establishment of preferences for a group of users based on network activity for the group.

In some embodiments, a user may select his preferences in addition to having preferences selected for him pursuant to embodiments of the present invention. For example, a user may still be able to utilize the Explorer® "Favorites" option in conjunction with embodiments of the present invention. In some embodiments, features of the present invention may be used to suggest or present alternative Web sites which may be of interest to the user. For example, if processing pursuant to embodiments of the invention indicate that a user frequents a particular financial information Web site, this information may be used to identify another financial information Web site that may also be of interest to the user. This information may be presented to the user as an alternative Web site that he can peruse if desired.

Although the present invention has been described with respect to a preferred embodiment thereof, those skilled in the art will note that various substitutions may be made to those embodiments described herein without departing from the spirit and scope of the present invention.

What is claimed is:

1. A client computing device operable by a user to interact with network sites over a network interface, the client computing device comprising:

a processor;

a communication port coupled to said processor of the client computing device and adapted to communicate with a plurality of network sites over said network interface; and a storage device coupled to said processor of the client computing device and storing browser software adapted to control said processor of the client computing device to download and display information from said plurality of network sites, characteristic information associated with each of a plurality of network sites, preference information including a ranking of preferred ones of said plurality of network sites as measured by said characteristic information for automatically configuring user preferences indicated by said browser software, and instructions adapted to be executed by said processor of the client computing device to:

detect network activity of said user associated with said client computing device when said user operates said browser software to interact with said plurality of network sites;

update said characteristic information based on said detected network activity of said computing client device, said characteristic information including information identifying a duration and frequency of visits to each of said plurality of network sites;

update said ranking preferred ones of said plurality of network sites based on said updated characteristic information to automatically reconfigure user preferences for said user associated with said client computing device as indicated by said browser software; and repeatedly detect and update as said user operates said client computing device such that said user preferences indicated by said browser software automatically reflect usage patterns of said user associated with said client computing device.

2. The client computing device of claim 1, wherein said characteristic information further includes information identifying at least one of:

(i) a network site with the greatest frequency of visits by said client computing device;

(ii) a network site having the greatest time spent by said client computing device;

(iii) a network site having the greatest number of downloads by said client computing device;

(iv) a network site for which said client computing device selected the largest window size; and (v) a network site having the greatest number of keystroke interaction by said client computing device.

3. The client computing device of claim 1, wherein said preference information further stores at least one alternative network site for at least one of said ranked network sites.

4. The client computing device of claim 1, wherein said network activity is detected by monitoring at least one of: (i) a time spent at a network site; (ii) a frequency of communications with a network site; (iii) a number of downloads from a network site; (iv) a window size while in communication with a network site; (v) a number of keystrokes while in communication with a network site.

5. A method for operating a client computing device to allow a user to internet with network sites over a network interface, the method comprising:

initiating operation of browser software on said client computing device;

automatically configuring said browser software using a set of preference information stored at said client computing device, said preference information including a ranking of preferred ones of said plurality of network sites, said ranking previously established based on characteristic information stored at said client computing device and automatically measured based on previous network activity of said user;

operating said browser software to interact with a plurality of network sites;

detecting at said client computing device interactions with said plurality of network sites;

updating said characteristic information stored at said client computing device based on said detected interactions, said characteristic information including information identifying the duration and frequency of visits to each of said plurality of network sites; and updating said ranking of preferred ones of said plurality of network sites based on said updated characteristic information to automatically reconfigure user preferences indicated by said browser software.

6. The client computing device of claim 1, wherein said instructions are provided as a plug-in or add-on to said browser software.

7. The client computing device of claim 1, wherein said instructions are integrated with said browser software.

* * * * *